United States Patent [19]

Stauner

[11] Patent Number: 4,946,209

[45] Date of Patent: Aug. 7, 1990

[54] FAST-ACTING CLAMPING DEVICE FOR RELEASABLY CONNECTING TWO COMPONENTS

[75] Inventor: Jakob Stauner, Nuernberg, Fed. Rep. of Germany

[73] Assignee: Siemens Aktiengesellschaft, Munich, Fed. Rep. of Germany

[21] Appl. No.: 313,620

[22] Filed: Feb. 21, 1989

[30] Foreign Application Priority Data

Feb. 23, 1988 [DE] Fed. Rep. of Germany ... 8802326[U]

[51] Int. Cl.$^5$ ................................................ E05C 5/04
[52] U.S. Cl. ............................. 292/256; 411/DIG. 3; 411/916; 411/535; 292/251
[58] Field of Search ............... 292/256, 256.71, 256.65, 292/256.67, 256.73, DIG. 49, 201, 96, 304, 257, 251; 411/432, 916, 535, 536, 384

[56] References Cited

U.S. PATENT DOCUMENTS

| | | | |
|---|---|---|---|
| 1,311,957 | 8/1919 | Ferris | 292/256.73 X |
| 2,772,596 | 12/1956 | Trussell | 411/535 |
| 3,406,997 | 10/1968 | Wilcox | 292/256 |
| 3,924,780 | 12/1975 | Elsworth | 292/256.71 X |
| 4,010,669 | 3/1977 | Klorin | 411/536 X |
| 4,331,326 | 5/1982 | Strouss | 269/93 |
| 4,854,798 | 8/1989 | Snyder et al. | 411/916 X |

FOREIGN PATENT DOCUMENTS

| | | |
|---|---|---|
| 0014878 | 9/1980 | European Pat. Off. . |
| 3116961 | 11/1982 | Fed. Rep. of Germany . |
| 2574975 | 6/1986 | France . |
| 339912 | 10/1963 | United Kingdom . |

*Primary Examiner*—Richard E. Moore
*Attorney, Agent, or Firm*—Herbert L. Lerner; Laurence A. Greenberg

[57] ABSTRACT

A fast-acting clamping device for releasably connecting first and second components includes a bolt passing through an opening in the first component and having one end with a head and another end with an anchoring device anchored in an opening in the second component. A cylinder is disposed on the first component, a piston is disposed in the cylinder and a rod is connected to the piston. A lever configuration is connected between the rod and the bolt for generating a clamping force between the head and the first component when a pressure medium is applied to the cylinder.

11 Claims, 4 Drawing Sheets

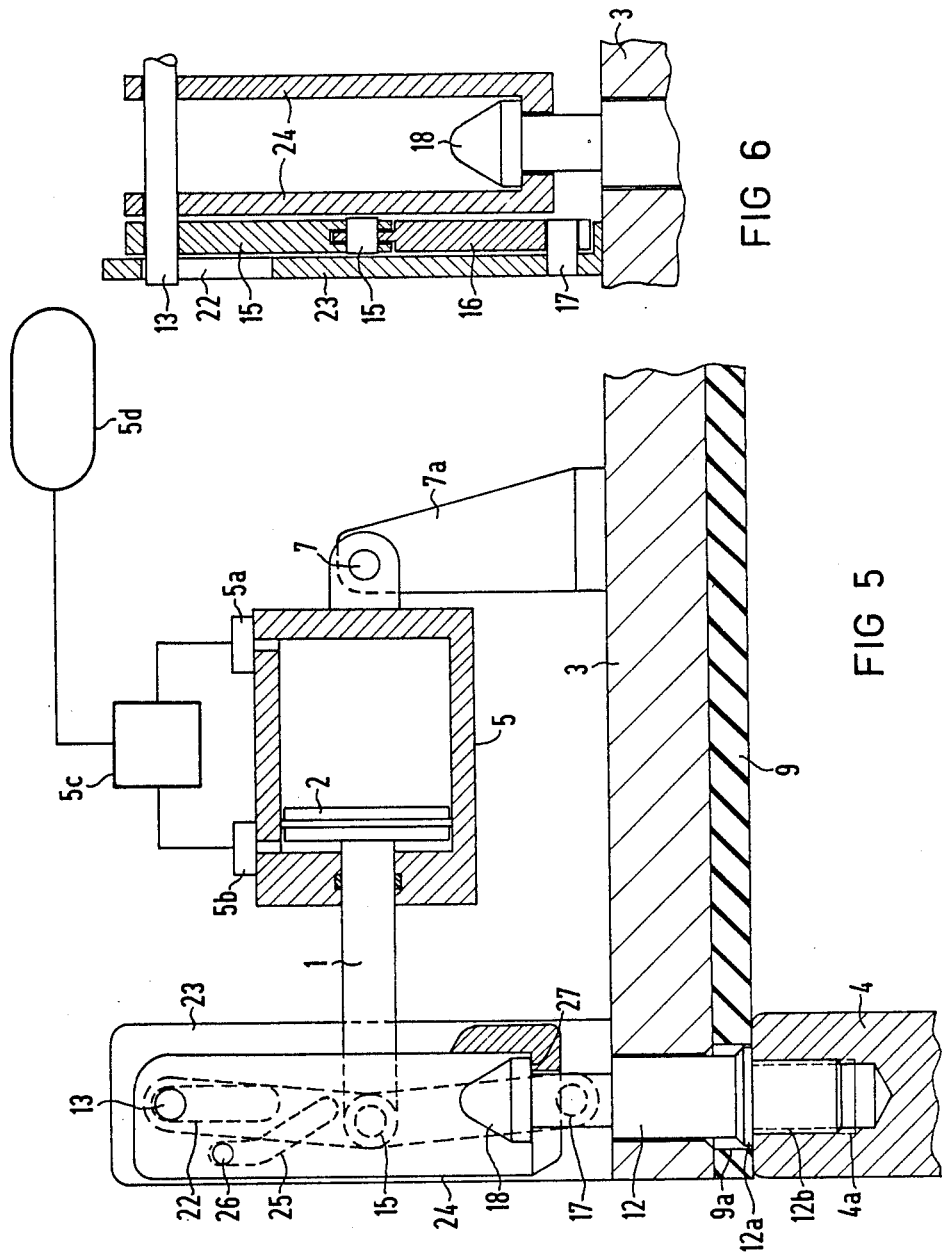

FAST-ACTING CLAMPING DEVICE FOR RELEASABLY CONNECTING TWO COMPONENTS

The invention relates to a fast-acting clamping device for releasably connecting two components, which may be used, for instance, for fastening a lid to a container or for attaching a sealing disk to a pipe connector discharging into a steam generator.

It is known from Published European Application No. 0 014 878 to provide a sealing disk with radially displaceable catches on the periphery thereof, which are brought into engagement with recesses on the inner periphery of the pipe connector, after the sealing disk has been inserted into a pipe connector. However, the prior art devices which provide liquid-tight and/or gas-tight connections are complex and slow acting.

It is accordingly an object of the invention to provide a fast-acting clamping device for releasably connecting two components, which overcomes the hereinaforementioned disadvantages of the heretofore-known devices of this general type and with which two components can be clamped together simply and quickly. Furthermore, when placing a seal between the two components, a liquid-tight and/or gas-tight releasable connection should be provided.

With the foregoing and other objects in view there is provided, in accordance with the invention, a fast-acting clamping device for releasably connecting first and second components, comprising a bolt passing through an opening in the first component and having one end with a head and another end with anchoring means anchored in an opening in the second component, a cylinder disposed on the first component, a piston disposed in the cylinder, a rod connected to the piston, and a lever configuration connected between the rod and the bolt for generating a clamping force between the head and the first component when a pressure medium is applied to the cylinder.

In accordance with another feature of the invention, the lever configuration includes a first joint supported on the head of the bolt, a second joint on the rod, and a lever having one end supported in the first joint and another end supported in the second joint.

In accordance with a further feature of the invention, there is provided a sleeve slipped over the bolt on which the first joint is disposed.

In accordance with an added feature of the invention, there is provided a third joint supported on the first component, and a guide rod having one end articulated on the second joint and forming one-half of a pair of scissors, the guide rod having another end supported in the third joint, and the cylinder being movably disposed on the first component.

In accordance with an additional feature of the invention, the anchoring means of the bolt are in the form of a thread.

In accordance with yet another feature of the invention, the bolt has a thickened portion on an end of the thread, which may be in the form of a collar.

In accordance with yet a further feature of the invention, the openings in the components are in the form of slits.

In accordance with yet an added feature of the invention, there is provided a support body guided on the bolt, the third joint being supported on the support body for supporting the guide rod on the first component, the anchoring means of the bolt being in the form of a hammer head guided through the openings in the components in the form of mutually aligned slits, and the hammer head being locked by rotation and clamped against the first component by actuation of the lever and the guide rod with the piston.

In accordance with yet an additional feature of the invention, there is provided a stop disposed on the lever configuration causing the second joint to be moved outward past a central plane of the bolt for self-locking when clamping the lever configuration.

In accordance with a concomitant feature of the invention, there is provided a support disposed on the first component having an oblong slot and another slot formed therein, the first joint being a joint bolt guided in the oblong slot and the third joint being supported on the support, and a rocker lever guided in the other slot and supported on the joint bolt for controlling the rocker lever as a function of the motion of the joint bolt, the rocker lever having a free end with a protrusion to be guided underneath the head of the bolt.

In contrast to the conventional connection of two components by means of locks, a gas or liquid-tight connection is attainable with simple means according to the invention. In contrast to a connection attainable by inserting screw bolts and turning them, the invention avoids a situation in which the clamping elements seize in the retaining means and the connection is impaired, or the connecting means are rendered useless, when the pressing force is applied between the two components.

Other features which are considered as characteristic for the invention are set forth in the appended claims.

Although the invention is illustrated and described herein as embodied in a fast-acting clamping device for releasably connecting two components, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 5 is a view similar to FIG. 4 of the fast-acting clamping member in the locked position; and FIG. 6 is a partly sectional, side-elevational view of the device as shown in FIG. 5.

Figure 1:
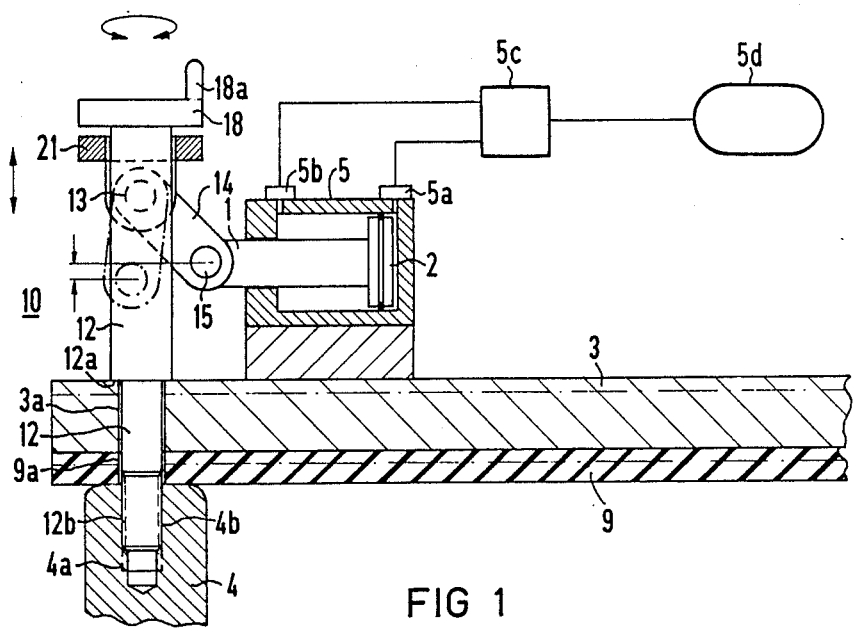
FIG. 1 is a fragmentary, diagrammatic, sectional view of a releasable connection for two components provided by means of a fast-acting clamping device.

Referring now to the figures of the drawing in detail and first, particularly, to FIG. 1 thereof, there is seen a device which makes it possible to fasten a first component 3 in the form of a disk to a second component 4, such as at the opening of a container, with an interposed seal 9, by means of fast-acting clamping members 10. Cylindrical openings 3a and 9a are provided at the edge of the component 3 and the seal 9, respectively. The component 4 has openings 4a in the form of cylindrical bores, which are formed and located identically to the openings 3a and 9a.

A bolt 12 of the fast-acting clamping member 10 protrudes through the opening 3a in the disk 3 and through the opening 9a in the seal 9 and has a thread 12b screwed into a thread 4b of the opening or bore 4a, far enough so that a collar-like thickened portion 12a of the bolt 12 just touches the outside of the component 3. In order to enable the bolt 12 to be turned by hand, a handle 18a is disposed on a head 18 of the bolt.

A lever configuration, which is connected through a rod 1 to a piston 2 of a cylinder 5, serves to generate a clamping force between the head 18 and the first component 3. The cylinder 5 has a connection piece 5a for actuating the piston 2 in the "clamping" direction of the fast-acting clamping member, and a connection piece 5b for "unclamping". The two connection pieces 5a, 5b communicate through pressure medium or fluid lines and a control device 5c, with a pressure medium or fluid container 5d. The cylinder 5, which is firmly attached to the first component 3, acts through the piston 2 and the rod 1 to actuate a lever 14. One end of the lever 14 is supported in a first joint 13 and the other end is joined to the rod 1 through a second joint 15. The joint 13 is disposed on a sleeve 21 which is slipped over the bolt 12 and is supported on the head 18.

If the cylinder 5 is subjected to pressure fluid through the connection piece 5a then the lever 14 and the component 3 assume the position shown in phantom so that the component 3 is pressed against the component 4 and the seal 9 deforms elastically.

The clamping action can be released again by supplying pressure fluid through the connection piece 5b, so that the two components 3, 4 can be separated from one another again within a very short time.

Figure 2:
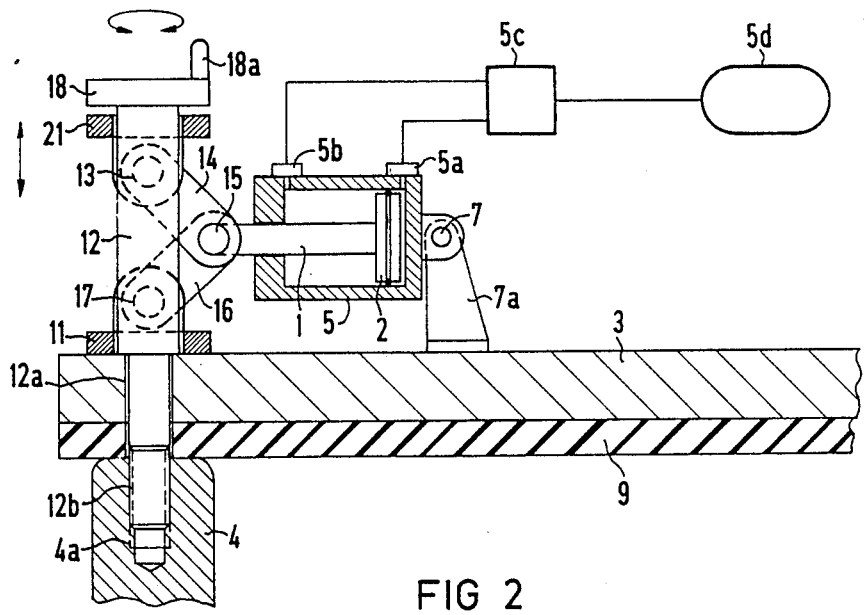
FIG. 2 is a view similar to FIG. 1 of another embodiment of the fast-acting clamping device.

FIG. 2 shows a fast-acting clamping device in which not only the lever 14 but also one end of a further guide rod 16 are pivoted in the joint 15 of the rod 1. The other end of the guide rod is supported in a third joint 17 which is supported on the first component. A bearing body 11 provides support in this case. The bearing body 11 is in the form of a sleeve which is fastened to the component 3 by screws or disposed in the form of a support post beside the bolt 12 on the component 3. The lever 14 and the guide rod 16 form one-half of a pair of scissors. The cylinder 5 is therefore movably secured to the first component 3 through a joint 7 and a bearing body 7a.

Figure 3:
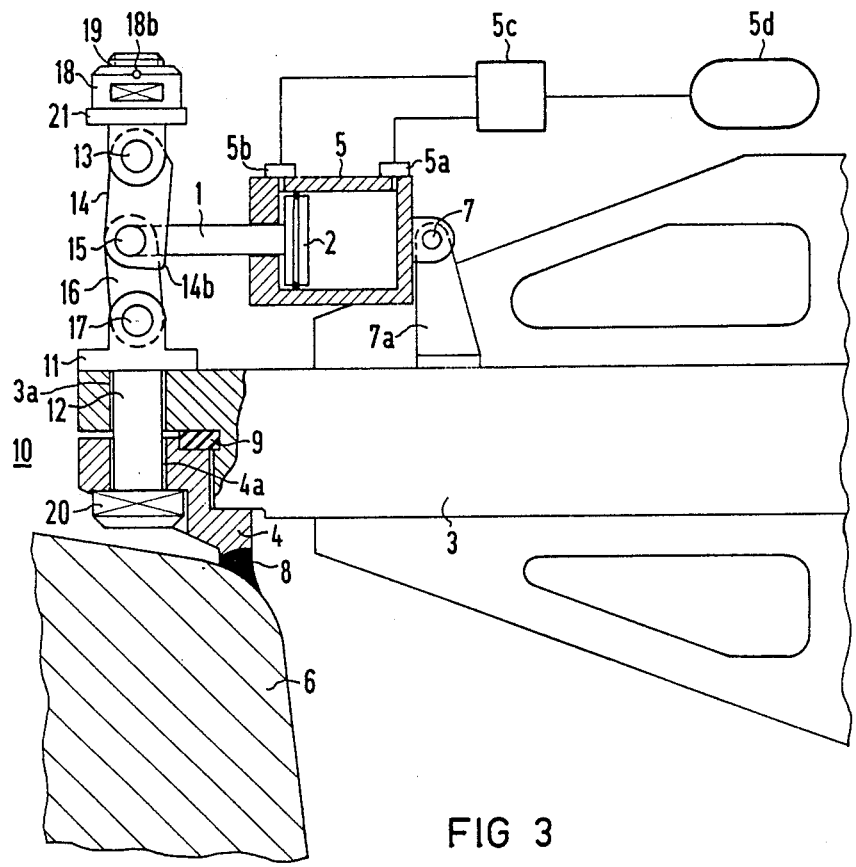
FIG. 3 is a fragmentary, diagrammatic, sectional view of a fastening of a sealing disk at the mouth of a pipe connector.

FIG. 3 shows a releasable connection of a first component 3 in the form of a sealing disk and a second component 4 which is in the form of a flange and is fastened by means of a welded seam 8 to the mouth of a pipe connector 6 of a steam generator. A ring-like seal 9 is disposed between the first component 3 and the second component 4. The openings 3a, 4a in the components 3 and 4 are in the form of slits which coincide with one another. The lower end of the bolt 12 of the fast-acting clamping member 10 has a hammer head 20, which is passed through the slits and can be anchored on the second component 4 in the form of a flange by rotating through 90°. The bolt 12 of the fast-acting clamping member is supported on the first component 3 through the bearing body 11. The guide rod 16 which is supported on the rod 1 through the joint 15, is also supported in the joint 17 of the bearing body 11. The rod 1 is connected through the joint 15, the lever 14 and the joint 13 with the sleeve 21 supported on the head 18 of the bolt 12. The head 18 is in the form of a nut that is screwed into an upper thread 19 of the bolt 12. The position of the head or nut 18 can be fixed by means of a splint 18b.

The fast-acting clamping member is shown in a clamped position, in which the piston 2 and the rod 1 have moved the joint 15 of the lever configuration past the central plane of the bolt 12 as far as a stop 14b and have thereby pressed the lever configuration into a self-locking position.

In order to unclamp the fast-acting clamping device, pressure fluid from the container 5d is supplied to the cylinder 5 through the control device 5c and the pressure fluid connection 5b. The piston 2 then moves into the opposite position, so that the clamping action between the support body 11 and the hammer head 20 is released, and the anchoring of the fast-acting clamping member through the hammer head 20 is released by rotating through 90°, permitting the component 3 to be lifted away from the component 4.

Figure 4:
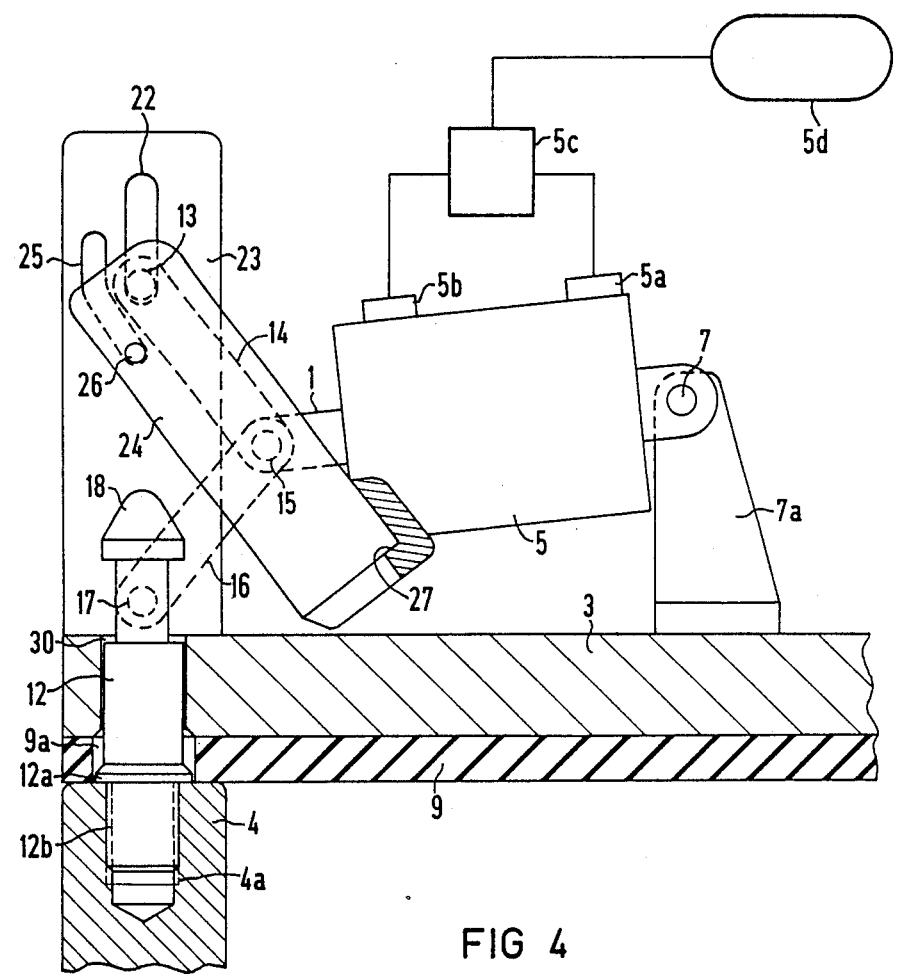
FIG. 4 is another similar but enlarged view of an embodiment of a connection of two components by means of a fast-acting clamping member in the normal position.

In the case of the fast-acting clamping device shown in FIG. 4, the bolt 12 is screwed into the opening 4a in the component 4 which is in the form of a cylindrical bore, far enough so that the thickened portion 12a which is in the form of a collar, rests on the top of the component 4. The component 3 which is provided with the openings 3a and the seal 9 can be placed on the component 4 having the anchored bolt 12. The neck and head 18 of the bolt protrude through the openings 9a in the seal 9 and the openings 3a in the component 3. The joint 13 of the lever configuration is in the form of a joint bolt and is guided in an oblong slot 22 of a support 23 which is disposed on the first component 3. Supported on the support 23 is a rocker lever 24, which is guided in a slot 25 in the support 23. A pin 26 disposed on the rocker lever 24 is associated with the slot 25. The free end of the rocker lever 24 has a protrusion 27 that is movable to a position under the head 18 of the bolt 12. The motion of the rocker lever 24 is controllable as a function of the motion of the joint 17 which is in the form of a joint bolt, in such a manner that after the actuation of the pressure cylinder 5 in the clamping direction, the protrusion 27 is first displaced to their position underneath the head 18 of the bolt 12, and then the clamping process is performed, as indicated in FIGS. 5 and 6).

In the unclamping process, the protrusion 27 engages the head 18 of the bolt 12 from below until complete unclamping has occurred and it is pivoted away from the head 18 after the unclamping process.

The embodiment shown in FIGS. 4–6 considerably shortens the assembly time for repeated attachment of the component 3 to, and its removal from, the component 4, because the bolt 12 need not be removed for removing the component 3.

The foregoing is a description corresponding in substance to German Application No. G 88 02 326.5, dated Feb. 23, 1988, the International priority of which is being claimed for the instant application, and which is hereby made part of the application. Any material discrepancies between the foregoing specification and the aforementioned corresponding German application are to be resolved in favor of the latter.

I claim:

1. Fast-acting clamping device for releasably connecting first and second components, comprising a bolt passing through an opening in the first component and having one end with a head and another end with anchoring means anchored in an opening in the second component, a cylinder disposed on the first component, a piston disposed in said cylinder, a rod connected to said piston, and a lever configuration connected between said rod and said bolt for generating a clamping force between said head and the first component when a pressure medium is applied to said cylinder.

2. Fast-acting clamping device according to claim 1, wherein said lever configuration includes a first joint supported on said head of said bolt, a second joint on said rod, and a lever having one end supported in said first joint and another end supported in said second joint.

3. Fast-acting clamping device according to claim 2, including a sleeve slipped over said bolt on which said first joint is disposed.

4. Fast-acting clamping device according to claim 2, including a third joint supported on the first component, and a guide rod having one end articulated on said second joint and forming one-half of a pair of scissors, said guide rod having another end supported in said third joint, and said cylinder being movably disposed on the first component.

5. Fast-acting clamping device according to claim 1, wherein said anchoring means of said bolt are in the form of a thread.

6. Fast-acting clamping device according to claim 5, wherein said bolt has a thickened portion on an end of said thread.

7. Fast-acting clamping device according to claim 6, wherein said thickened portion is in the form of a collar.

8. Fast-acting clamping device according to claim 1, wherein the openings in the components are in the form of slits.

9. Fast-acting clamping device according to claim 4, including a support body guided on said bolt, said third joint being supported on said support body for supporting said guide rod on the first component, said anchoring means of said bolt being in the form of a hammer head guided through the openings in the components in the form of mutually aligned slits, and said hammer head being locked by rotation and clamped against the first component by actuation of said lever and said guide rod with said piston.

10. Fast-acting clamping device according to claim 9, including a stop disposed on said lever configuration causing said second joint to be moved outward past a central plane of said bolt for self-locking when clamping said lever configuration.

11. Fast-acting clamping device according to claim 4, including a support disposed on the first component having an oblong slot and another slot formed therein, said first joint being a joint bolt guided in said oblong slot and said third joint being supported on said support, and a rocker lever guided in said other slot and supported on said joint bolt for controlling said rocker lever as a function of the motion of said joint bolt, said rocker lever having a free end with a protrusion to be guided underneath said head of said bolt.

* * * * *